United States Patent [19]
Foutz et al.

[11] Patent Number: 5,653,279
[45] Date of Patent: Aug. 5, 1997

[54] APPARATUS AND METHOD FOR FORMING ELECTRICAL CONNECTIONS

[75] Inventors: George W. Foutz, Rocky River; Richard E. Singer, Beachwood, both of Ohio

[73] Assignee: Erico International Corporation, Solon, Ohio

[21] Appl. No.: 535,372

[22] Filed: Sep. 28, 1995

[51] Int. Cl.$^6$ ................................................ B23K 23/00
[52] U.S. Cl. .......................................... 164/54; 228/234.3
[58] Field of Search .......................... 228/234.3; 164/53, 164/54; 266/83, 86, 135

[56] References Cited

U.S. PATENT DOCUMENTS

| | | | |
|---|---|---|---|
| 2,011,955 | 8/1935 | Touceda | 164/53 |
| 2,482,093 | 9/1949 | Carlson | 164/54 X |
| 3,004,310 | 10/1961 | Burke | 22/116 |
| 3,022,554 | 2/1962 | Burke | 22/116 |
| 3,113,359 | 12/1963 | Burke | 22/116 |
| 3,234,603 | 2/1966 | Leuthy et al. | 22/58 |
| 3,255,498 | 6/1966 | Leuthy et al. | 22/58 |

FOREIGN PATENT DOCUMENTS

| | | | |
|---|---|---|---|
| 78730 | 3/1993 | Japan | 266/135 |

OTHER PUBLICATIONS

Article Cadweld® Electrical Connections, Materials And Tools, Section A, pp. A1–A8, 1989, Erico Products Inc.

*Primary Examiner*—Kenneth J. Ramsey
*Attorney, Agent, or Firm*—Renner, Otto, Boisselle, Sklar

[57] ABSTRACT

A two part exothermic weld mold assembly is horizontally split through a weld cavity. The upper single mold port includes a crucible offset from the weld cavity. The tap hole from the crucible to the weld cavity includes a vertical section and a slanted or inclined section, the latter being a through-hole from the weld cavity to the exterior of the mold. The inclined through-hole serves to vent gasses during welding and also enables the tap hole and adjoining weld chamber more easily to be cleaned for reuse.

11 Claims, 1 Drawing Sheet

5,653,279

APPARATUS AND METHOD FOR FORMING ELECTRICAL CONNECTIONS

DISCLOSURE

This invention relates generally as indicated to apparatus and methods for forming electrical connections, and more particularly to exothermic reaction molds and mold assemblies for forming exothermic welds, and to methods of forming such welds.

BACKGROUND OF THE INVENTION

Exothermic welds have long been recognized and the best electrical quality connection between two parts or conductors. No mechanical connection makes a comparable low resistance, high ampacity, long lived connection.

Exothermic welds are made using graphite as ceramic mold parts which form a crucible, a weld chamber, and an interconnecting tap hole. An exothermic reaction mixture is placed in the crucible on a fusible steel disc. When the exothermic material is ignited, the reaction produces molten metal which fuses the disc. The molten metal runs down through the tap hole and welds the parts to be welded in the weld chamber. Any slag formed rises to the top and enters the tap hole last to collect in an expanded section of the tap hole called a riser chamber. The slag is removed after the weld is formed.

After the weld is cooled, the molds are opened and cleaned for reuse. A mold set is usually opened and closed by one or more toggle frames which when closed, clamp the parts together to form the complete mold assembly.

Exothermic welds are used for a variety of connections which range from full fusion connections to "tack" welds. "Tack" welds are usually smaller charges and are widely used to "tack" a conductor to a surface or another object such as a ground rod, pipe, rebar, rail, or any major surface such as a steel sheet, column or beam.

Where the weld is to be formed on the side of a vertical object such as a ground rod or rebar, the crucible may be horizontally offset from the weld chamber and connected to the weld chamber by a dog leg tap hole, or one which has a significant bend or curvature to it.

A tap hole that cannot be readily cleaned usually requires three mold parts, two split along the axis of the hole, and both split from a third through the weld chamber. This makes the apparatus, and the assembly and opening of the mold parts complex, expensive, and awkward. Since mold parts and subassemblies are held together and opened and closed by toggle frames, three parts usually requires two frames which project from the molds. If other parts such as a clamp are used to hold the assembly to a workpiece or part, the entire assembly becomes overly complex and requires a considerable amount of space.

The economics of exothermic welding, whether the weld be a full fusion weld or simply a "tack" weld, dictate that the apparatus be as simple as possible and reusable. If preparation or limited life parts adds to the cost, then at some point the owner will sacrifice a quality electrical connection for cost.

Accordingly, it would be desirable to have a mold assembly for such welds having only two parts, greatly simplifying the assembly, but also one in which the tap hole can quickly be cleaned for reuse.

SUMMARY OF THE INVENTION

A two part mold assembly for welding a conductor to an object is split horizontally through conductor sleeving passages and the weld chamber. The upper part of the mold assembly includes a crucible and a tap hole leading to the weld chamber. The tap hole includes a vertical section which intersects a slanted or inclined through-hole section which extends from the exterior of the upper part to the weld chamber. The inclined section of the tap hole functions to assist in the venting of gasses but also to enable the tap hole to be cleaned out simply by inserting a cleaning tool from the exterior of the mold part. The inclined through-hole is linear and of uniform diameter to receive a cleaning tool when the mold assembly is open. Such slanted hole is also without obstruction so that a cleaning tool may be inserted from either end. The hole preferably extends at about 45° to the vertical section of the tap hole.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
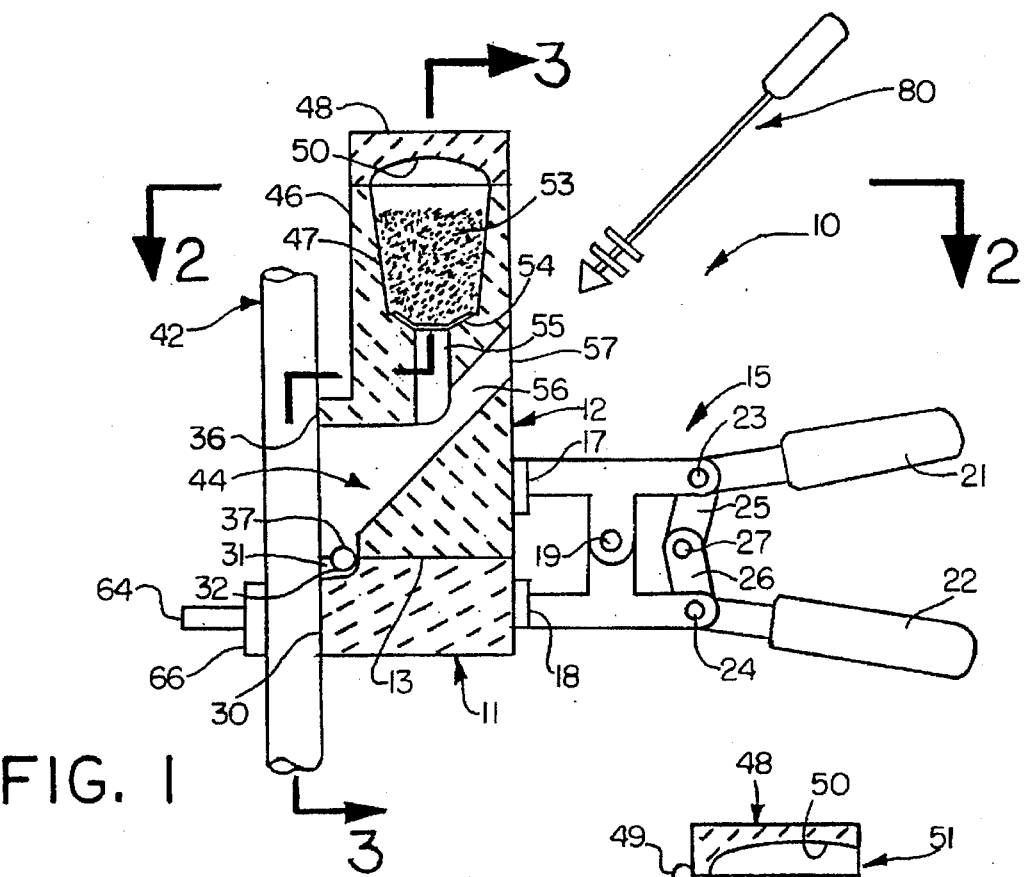
FIG. 1 is a vertical section side view of a two part mold assembly in accordance with the present invention with the parts closed and ready for welding.

Referring now to the drawing, and more particularly to FIG. 1, there is illustrated a two part mold assembly shown generally at 10 in accordance with the present invention. The assembly comprises a lower mold part 11 and an upper mold part 12 which mate on a horizontal parting plane 13. The mold parts are clamped together by a toggle frame shown generally at 15. The toggle frame not only firmly clamps the parts together at the parting plane 13, but also opens the mold parts for disassembly, cleaning and reuse.

The toggle frame includes frames 17 and 18 secured to the respective mold parts. The frames are hinged together at 19. Handles seen at 21 and 22 are pivoted at 23 and 24, respectively, to extensions of the respective frames. The handles each include respective inwardly offset arms seen at 25 and 26 which are pivoted together at 27. By pushing the two handles together, the pivot 27 snaps over center between the pivots 23 and 24 toggle locking the two mold parts together, abutting each other at the parting plane 13.

To open the molds, the handles 21 and 22 are separated causing the mold parts to hinge away from each other about the hinge pivot 19.

The lower mold part 11 is relatively simple and is a relatively shallow rectangular block of graphite or ceramic material, which has been machined to the shape and configuration shown and described. The other mold part is similarly formed from a graphite or ceramic material.

Figure 3:
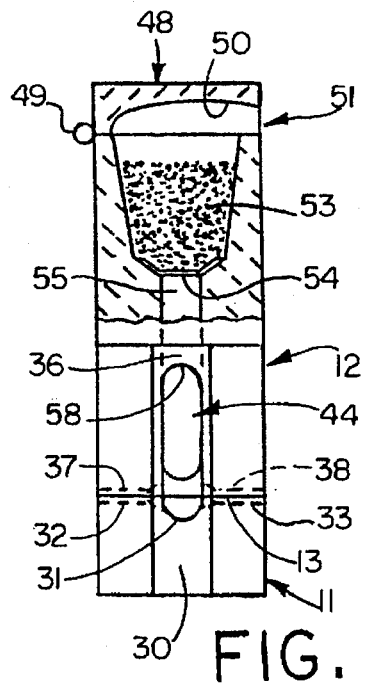
FIG. 3 is a partially in section front view of the two mold parts as seen from the line 3—3 of FIG. 1.

The lower mold part 11 includes a vertical semi-circular channel 30 in the front face thereof as seen more clearly in FIG. 3. The upper end of the semi-circular channel 30 communicates with a chamber 31. Extending on each side of the chamber 31 is a semi-circular horizontal recess as seen at 32 and 33. Such recesses are aligned and the parting plane forms a diameter of such recesses.

The upper mold part includes a corresponding front face toward the viewer in FIG. 3 which includes a semi-circular recess 36 aligned with the recess 30 in the lower mold part. The downwardly facing surface of the upper mold part, or that surface which forms the parting plane 13, includes semi-circular recesses 37 and 38 which mate with the recesses 32 and 33 of the lower mold part. When the mold is closed, the mating recesses 32, 33, 37 and 38 form sleeving passages for a conductor shown at 40 in 30 FIG. 2. Similarly, the aligned semi-circular recesses 30 and 36 form a passage to accommodate the second part to be welded indicated at 42. The part 42 may, for example, be a ground rod or a reinforcing rod and the conductor 40 is to be welded to rod 42.

The conductor 40 extends through the lower end of the weld chamber shown generally at 44 which is formed primarily in the upper mold part 12 and to a lesser extent by the chamber 31 in the lower mold part 11. When the mold parts are closed and clamped to the rod 42, the rod closes the front of the weld chamber 44 which otherwise would open into the semi-circular slot.

The upper mold part includes an offset vertical extension indicated at 46 which contains a crucible chamber 47. A lid is provided for the crucible as indicated at 48, hinged at 49 (see FIG. 3), and provided with an arched roof 50, opening to the side at 51. The crucible is illustrated in FIGS. 1 and 3 as containing an exothermic reaction mixture 53. The mixture is contained at the bottom by a fusible steel disc 54. The steel disc closes the bottom of the crucible and is situated at the top of tap hole vertical section 55. The vertical section of the tap hole flows into an inclined section 56 which is in the form of a through-hole extending to the weld chamber 44 at its lower end and through port 57 at its upper end which is considerably above the bottom of the vertical section of the tap hole.

The weld chamber 44 is vertically enlarged and extends from the lower section 31 in the lower mold part to arched roof 58 which is at the same elevation as the fork between the vertical and inclined tap hole sections.

Figure 2:
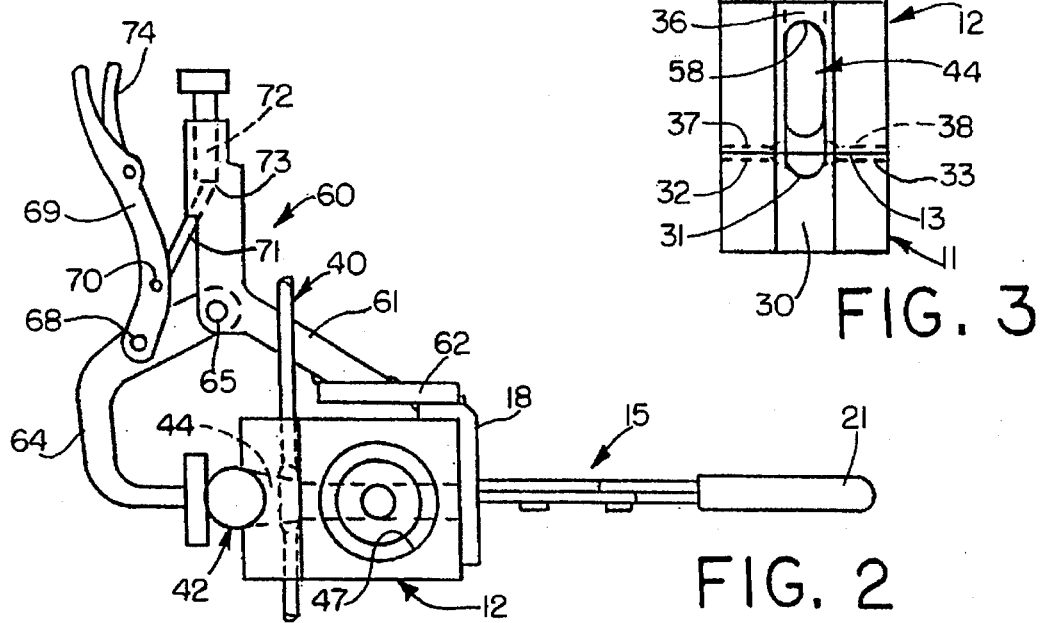
FIG. 2 is a top plan view of the assembly as seen from the line 2—2 of FIG. 1.

In order to clamp the mold assembly to the vertically extending rod 42, a toggle C-clamp may be incorporated in the toggle frame 15 as illustrated more clearly in FIG. 2. The toggle C-clamp is indicated generally at 60 and one of the legs 61 of the clamp has been welded to bracket 62, in turn welded to frame 18. The opposite leg 64 is pivoted to the leg 61 at 65 and terminates in a pad 66 which bears against the rod 42 when the clamp is closed and toggle locked. Pivoted to the leg 64 at 68 is a toggle arm 69. Also pivoted to the leg 69 at 70 is a toggle link 71 which bears against adjustable stop 72 at 73. The contact point 73 is one pivot of the three pivot toggle with the pivots 70 and 68 being the other two. When the lever 69 is moved to the right as seen in FIG. 2, the center pivot 70 moves over center locking the leg 64 and thus the clamp pad 66 in place securing the entire mold assembly to the rod 42. The toggle may be released by the release lever 74.

In operation, the two part mold assembly is formed and closed about the conductor 40 and clamped against the rod 42 by the C-clamp 60. A charge of exothermic material is placed in the crucible above the steel disc 54. With the parts in place, and with a starting compound on top of the exothermic material 54, such starting compound and the exothermic material is ignited through the closed lid 48. The reaction may be ignited by a flint gun or electrically, for example. Instead of the lid shown, a crucible with an emissions filter may be used. Such systems are sold under the registered trademark EXOLON® by Erico, Inc. of Solon, Ohio, U.S.A.

When the exothermic reaction occurs, molten metal will be formed fusing the disc 54 which permits the molten metal to run down the vertical section 55 of the tap hole to the inclined section 57 and from the inclined section into the weld chamber 44. The weld chamber encloses the molten metal about the juncture between the two parts to be welded and such parts are welded together. The slag or other debris formed by the reaction will normally collect in the upper portion of the weld chamber which extends to the arched roof 58. During the exothermic reaction, excess gasses and smoke will vent outwardly through the inclined hole 56 and the port 57 which opens to the exterior of the mold. The enlarged upper portion of the weld chamber acts as a riser chamber to collect the slag as the weld cools. The slag will later be removed. When the weld has cooled, initially the C-clamp is opened and then the toggle frames are opened. The now opened mold assembly is removed from the weld for cleaning and reuse.

Since the tap hole includes a dog leg bend, it could not easily be cleaned for reuse without the inclined extension to the port 57, unless the mold parts were vertically split along the axis of the tap hole. Even then, the mold part should be removed from the frame for proper cleaning. With the present invention, the mold need not be removed from the frame. When the mold is open, the inclined portion of the tap hole is a uniform diameter through-hole which is unobstructed by any mold part. In the manner, a cleaning tool such as illustrated at 80 may readily be inserted into the inclined section of the tap hole to clean it of any slag or debris which may have resulted from the welding operation. The cleaning tool may be in the form of a ream or a stiff bottle brush, or two or more cleaning tools may be employed. In any event, the tap hole and the riser chamber as well as the weld chamber may readily and quickly be cleaned for reuse. In this manner, a mold assembly of normally three parts may be made of only two parts.

Although the illustrated embodiment shows a conductor being welded to a vertical rod such as a ground rod or steel reinforcing bar, it will be appreciated that the present invention has many other uses. For example, for "tack" welds, the apparatus may be used to join conductors to rail, pipe or any flat or vertical surface. Grounding signaling and cathodic protection connections are typical of the many applications.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. Apparatus for forming a welded electrical connection comprising a refractory mold assembly having a crucible for containing a charge of exothermic reaction mixture, a weld chamber for receiving the parts to be welded vertically offset from the crucible, and a tap hole extending from the bottom of the crucible to the weld chamber, said tap hole including a generally vertical section and a slanted sections,said slanted section extending from said weld chamber to the exterior of said mold assembly and hung unobstructed whereby cleaning tool may be inserted through said slanted section to clean any debris or slag therefrom after the weld is formed.

2. Apparatus as set forth in claim 1 wherein said slanted section extends at an angle of about 45° to said generally vertical Section.

3. Apparatus as set forth in claim 1 wherein said weld chamber is vertically enlarged, and said vertical and slanted sections intersect on about the same elevation as the top of the weld chamber.

4. Apparatus as set forth in claim 1 wherein said weld chamber is formed by two clamped mold parts, a portion of said weld chamber, both vertical and slanted tap hole sections, and said crucible being formed wholly in one of said parts.

5. Apparatus as set forth in claim I wherein said mold assembly comprises two horizontally split mold parts, the upper of said parts forming the crucible and tap hole sections.

6. Apparatus as set forth in claim 5 including means to clamp said mold parts together to form an assembly.

7. Apparatus as set forth in claim 6 including means to clamp said assembly to one of said parts to be welded.

8. A method of forming an exothermic weld comprising the steps of forming a mold assembly, forming an exothermic reaction charge in a crucible, igniting such charge to cause the molten metal formed thereby to flow downwardly through a vertical passage section and then a slanted passage section into a weld chamber all in said assembly, said slanted passage section being linear and unobstructed, and then after such weld is formed, opening such assembly and using a tool inserted through such slanted passage to clean the mold assembly of slag and debris for reuse.

9. A method as set forth in claim 8 wherein said slanted passage section extends from the weld chamber to the exterior of the mold assembly.

10. A method as set forth in claim 9 wherein the cleaning tool is inserted from the exterior of the mold assembly.

11. A method as set forth in claim 8 wherein said weld chamber is formed by two clamped mold parts, a portion of such weld chamber, both vertical and slanted passage sections, and said crucible being formed wholly in one of said parts.

* * * * *

UNITED STATES PATENT AND TRADEMARK OFFICE
CERTIFICATE OF CORRECTION

PATENT NO.: 5,653,279

DATED: August 5, 1997

INVENTOR(S): George W. Foutz, et al.

It is certified that error appears in the above-identified patent and that said Letters Patent is hereby corrected as shown below:

Claim 1, line 9, "and hung unobstructed" should read --and being unobstructed--.
Claim 2, line 3, "Section" should read --section--.

Signed and Sealed this

Twenty-first Day of October 1997

Attest:

BRUCE LEHMAN

*Attesting Officer*  *Commissioner of Patents and Trademarks*